(12) United States Patent
Manikas et al.

(10) Patent No.: US 10,641,042 B2
(45) Date of Patent: May 5, 2020

(54) EXTERNAL LADDER ASSEMBLY FOR WIND TURBINE NACELLE

(71) Applicant: General Electric Company, Schenectady, NY (US)

(72) Inventors: Brian William Manikas, Schenectady, NY (US); Gregory Clarence Thomas, Saratoga Springs, NY (US); Paul Howard Davidson, Albany, NY (US)

(73) Assignee: General Electric Company, Schenectady, NY (US)

( * ) Notice: Subject to any disclaimer, the term of this patent is extended or adjusted under 35 U.S.C. 154(b) by 40 days.

(21) Appl. No.: 15/805,168

(22) Filed: Nov. 7, 2017

(65) Prior Publication Data

US 2019/0136626 A1 May 9, 2019

(51) Int. Cl.
| | | |
|---|---|---|
| *E06C 9/02* | (2006.01) | |
| *E06C 7/48* | (2006.01) | |
| *E06C 7/18* | (2006.01) | |
| *F03D 80/50* | (2016.01) | |
| *E04G 3/20* | (2006.01) | |
| *F03D 13/10* | (2016.01) | |
| *E04G 5/14* | (2006.01) | |

(Continued)

(52) U.S. Cl.
CPC ............ *E06C 9/02* (2013.01); *E04G 3/20* (2013.01); *E04G 3/243* (2013.01); *E04G 5/14* (2013.01); *E06C 7/181* (2013.01); *E06C 7/48* (2013.01); *F03D 13/10* (2016.05); *F03D 80/00* (2016.05); *F03D 80/50* (2016.05); *F05B 2240/14* (2013.01)

(58) Field of Classification Search
CPC ... E06C 9/02; E06C 7/48; E06C 7/181; F03D 13/10; E04G 3/20; E04G 5/14; F05B 2240/14
See application file for complete search history.

(56) References Cited

U.S. PATENT DOCUMENTS

| | | | |
|---|---|---|---|
| 6,907,957 B1 * | 6/2005 | Couch ................... | E02D 17/08 |
| | | | 182/106 |
| 9,039,368 B2 | 5/2015 | Sivalingam et al. | |

(Continued)

FOREIGN PATENT DOCUMENTS

| | | | | | |
|---|---|---|---|---|---|
| DE | 202011100364 U1 * | 1/2012 | ............... | E06C 7/12 |
| DE | 202014001178 U1 * | 5/2014 | ............... | B32B 7/12 |

(Continued)

OTHER PUBLICATIONS

Dictionary.com Unabridged Based on the Random House Unabridged Dictionary, © Random House, Inc. 2019 (Year: 2019).*

*Primary Examiner* — Katherine W Mitchell
*Assistant Examiner* — Candace L Bradford
(74) *Attorney, Agent, or Firm* — Dority & Manning, P.A.

(57) ABSTRACT

An external ladder assembly for a nacelle of a wind turbine includes at least one ladder having parallel side legs and a plurality of rungs arranged between the parallel side legs. The ladder assembly also includes a ladder platform arranged with the ladder and configured for placement atop the nacelle. Further, the ladder assembly includes a mounting assembly for affixing the ladder platform atop the nacelle. More specifically, the mounting assembly is adjustable between multiple positions so as to level the ladder platform atop the nacelle. Thus, the ladder assembly provides access to one or more uptower, external features of the wind turbine.

9 Claims, 7 Drawing Sheets

(51) Int. Cl.
*F03D 80/00* (2016.01)
*E04G 3/24* (2006.01)

(56) References Cited

U.S. PATENT DOCUMENTS

| | | | |
|---|---|---|---|
| 9,228,562 B2 | 1/2016 | Mercado Diez et al. | |
| 2002/0084142 A1* | 7/2002 | Brennan | B66B 9/187 |
| | | | 182/133 |
| 2009/0206610 A1* | 8/2009 | Martin | F03D 80/82 |
| | | | 290/55 |
| 2010/0129216 A1* | 5/2010 | Bagepalli | F03D 80/50 |
| | | | 416/61 |
| 2010/0155176 A1* | 6/2010 | Lohr | E06C 7/16 |
| | | | 182/113 |
| 2011/0097202 A1* | 4/2011 | de Buhr | F03D 80/00 |
| | | | 415/201 |
| 2011/0248506 A1* | 10/2011 | Ruiz Urien | F03D 80/88 |
| | | | 290/55 |
| 2013/0299277 A1* | 11/2013 | Kyatham | E06C 9/02 |
| | | | 182/129 |
| 2013/0309090 A1* | 11/2013 | Abolfazlian | B66C 23/207 |
| | | | 416/1 |
| 2014/0027202 A1* | 1/2014 | Bancroft | E06C 7/188 |
| | | | 182/107 |
| 2014/0050591 A1* | 2/2014 | Munk-Hansen | F03D 80/50 |
| | | | 416/244 R |
| 2014/0219812 A1* | 8/2014 | Abolfazlian | F03D 1/00 |
| | | | 416/244 R |
| 2015/0354233 A1* | 12/2015 | Ebbesen | F03D 1/0691 |
| | | | 182/222 |

FOREIGN PATENT DOCUMENTS

| | | | | |
|---|---|---|---|---|
| DE | 202013006669 U1 * | 10/2014 | | E06C 1/381 |
| WO | WO-0238953 A2 * | 5/2002 | | E06C 9/02 |

* cited by examiner

EXTERNAL LADDER ASSEMBLY FOR WIND TURBINE NACELLE

FIELD

The present subject matter relates generally to wind turbines, and more particularly to an external ladder assembly for a wind turbine nacelle that provides access to working platforms for personnel during repair procedures.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Over time, the various wind turbine components may become worn and/or damaged due to loads and forces from the wind acting on the wind turbine. Unfortunately, repair of such components often requires the wind turbine components to be removed from atop the nacelle and transported to a manufacturing facility, which can be very time-consuming and labor intensive. Even still, if such repairs are made uptower, the nacelle has minimal space and/or working surfaces therein, thereby making it difficult for personnel to complete the needed tasks. Often, external cranes are needed to perform maintenance and repair on wind turbine components at the top of the tower. However, the use of such external cranes can increase costs associated with the aforementioned repair/replacement procedures.

Some repair and servicing operations use an external platform to provide a working space for the technicians. More specifically, such platforms can be used to provide safe access to areas of a wind turbine that may require servicing, maintenance, and/or inspection. Due to the height of wind turbine towers, safely accessing such working platforms and safety precautions such as fall protection are concerns. Some wind turbine nacelles do not have external hatches on the sides thereof, but rather, have hatches on their roofs. As such, safely accessing the side-mounted working platform from the nacelle roof can create a challenge.

Accordingly, the present disclosure is directed to an external ladder assembly mountable to the roof of the nacelle that provides access to working platforms for personnel during service, maintenance, and/or inspection procedures.

BRIEF DESCRIPTION

Aspects and advantages of the invention will be set forth in part in the following description, or may be obvious from the description, or may be learned through practice of the invention.

In one aspect, the present disclosure is directed to an external ladder assembly for a nacelle of a wind turbine. The ladder assembly includes at least one ladder having parallel side legs and a plurality of rungs arranged between the parallel side legs. The ladder assembly also includes a ladder platform arranged with the ladder and configured for placement atop the nacelle. Further, the ladder assembly includes a mounting assembly for affixing the ladder platform atop the nacelle. More specifically, the mounting assembly is adjustable between multiple positions so as to level the ladder platform atop the nacelle. Thus, the ladder assembly provides access to one or more uptower, external features of the wind turbine.

In one embodiment, the mounting assembly may include a mounting frame with at least one adjustable frame member. In such embodiments, the mounting frame is mountable atop the nacelle and the adjustable frame member(s) is configured to lift or lower the ladder platform so as to provide a level surface atop the nacelle. In another embodiment, the mounting assembly may include at least two adjustable frame members that are configured to lift or lower the ladder platform so as to provide a level surface atop the nacelle.

In further embodiments, the adjustable frame member(s) may have a first end and second end. As such, the first end may be mounted to the mounting frame via at least one fastener at a rotatable hinge point, with the second end rotatable about the hinge point via at least one jacking component. Thus, the jacking component(s) is configured to lift and/or lower the second end of the adjustable frame member(s) so as to lift and/or lower the ladder platform. Once adjusted, the frame member is securable in place to maintain a position of the ladder platform after the ladder platform is level.

In additional embodiments, the mounting frame may also include one or more locating features for aligning the ladder platform thereon. For example, in one embodiment, the locating feature(s) may include front locating features, rear locating features, side locating features, or combinations thereof.

In several embodiments, the ladder may be configured for placement adjacent to an exterior side of the nacelle. Further, the uptower, external features of the wind turbine may include a platform, a pitch bearing, a rotor, a hub, a rotor blade, an access door, or similar. As such, by placing the ladder adjacent to an exterior side of the nacelle, such uptower, external features are easily and safely accessible without the use of a crane.

In additional embodiments, the ladder assembly may also include a tie off location for personnel. In similar embodiments, the ladder and/or the ladder platform may also include one or more handrails for personnel. It should be further understood that the ladder assembly may also include any safety features as needed for personnel safety.

In another aspect, the present disclosure is directed to a method for providing access to one or more uptower, external features of a wind turbine without the use of a crane. The method includes mounting a mounting assembly to a top wall of a nacelle of the wind turbine. The method also includes securing a ladder platform atop the mounting assembly. Further, the method includes adjusting the ladder platform via the mounting assembly until the ladder platform is level on the top wall. Moreover, the method includes securing a ladder to the ladder platform so as to provide access to the one or more uptower, external features of the wind turbine. It should be understood that the method may further include any of the additional steps and/or features as described herein.

In yet another aspect, the present disclosure is directed to a nacelle assembly of a wind turbine mounted atop a tower. The nacelle assembly includes a nacelle defining, at least, a plurality of side walls and a top wall and an external ladder assembly. The ladder assembly includes at least one ladder arranged adjacent to one of the plurality of side walls of the nacelle, a ladder platform arranged on the top wall of the nacelle with the at least one ladder, and a mounting assembly affixing the ladder platform to the top wall. Further, the mounting assembly is adjustable between multiple positions so as to level the ladder platform on the top wall. It should be understood that the nacelle assembly may further include any of the additional features as described herein.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
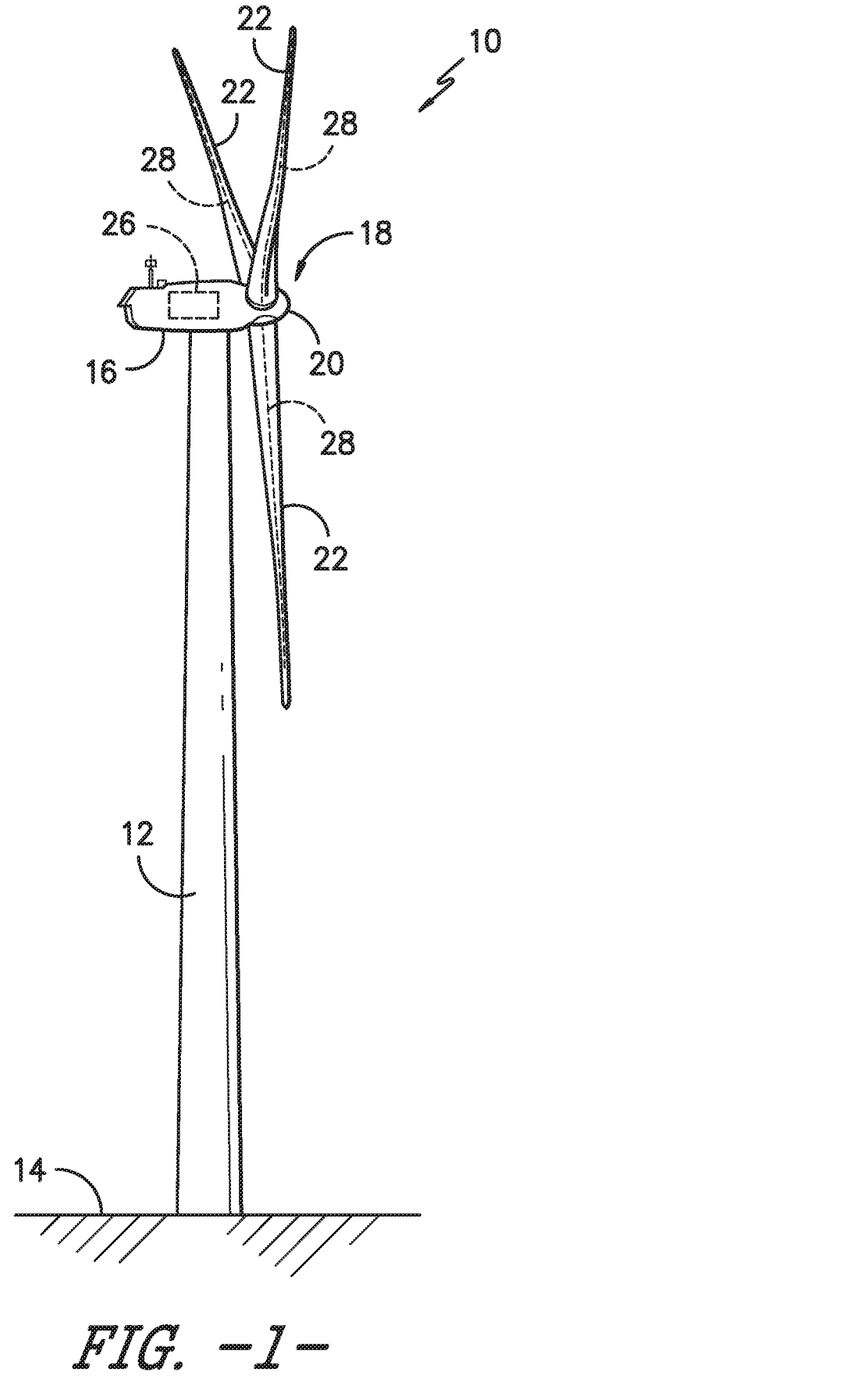
FIG. 1 illustrates a perspective view of one embodiment of a wind turbine according to the present disclosure.

Referring now to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. Thus, as shown in FIG. 3, the nacelle 16 corresponds to the overall housing structure and has a base or bottom wall 17, opposing side walls 19, a front wall 21, a rear wall 23, and a top wall 25 or roof. Further, as shown, the front wall 21 may have an opening 27 configured to receive a main shaft 34 (FIG. 2) therethough that is connectable to the rotor 18.

As shown in FIG. 1, the rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the components. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals.

Figure 2:
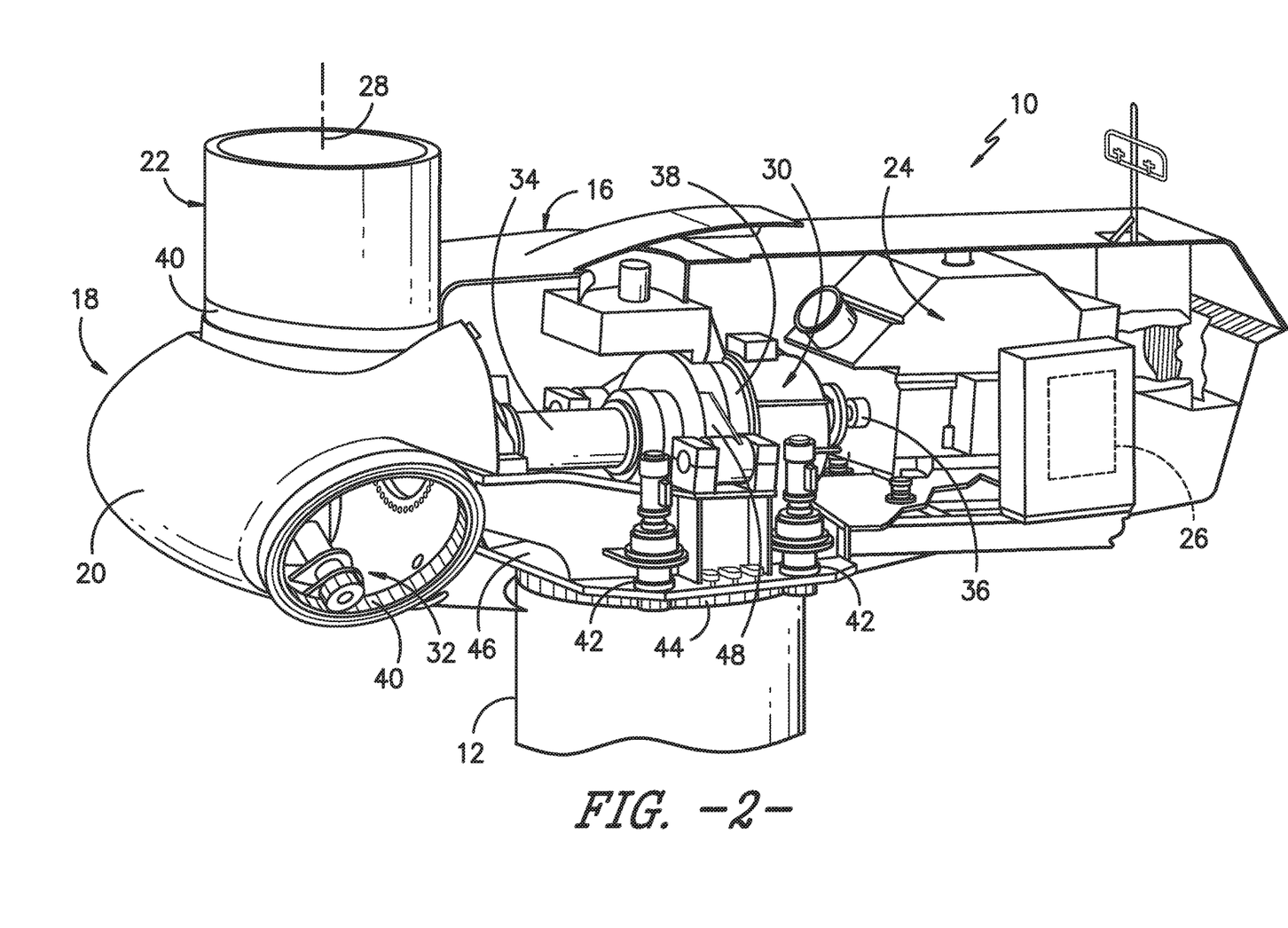
FIG. 2 illustrates a simplified, internal view of one embodiment of a nacelle of a wind turbine according to the present disclosure, particularly illustrating the nacelle during normal operation.
Figure 3:
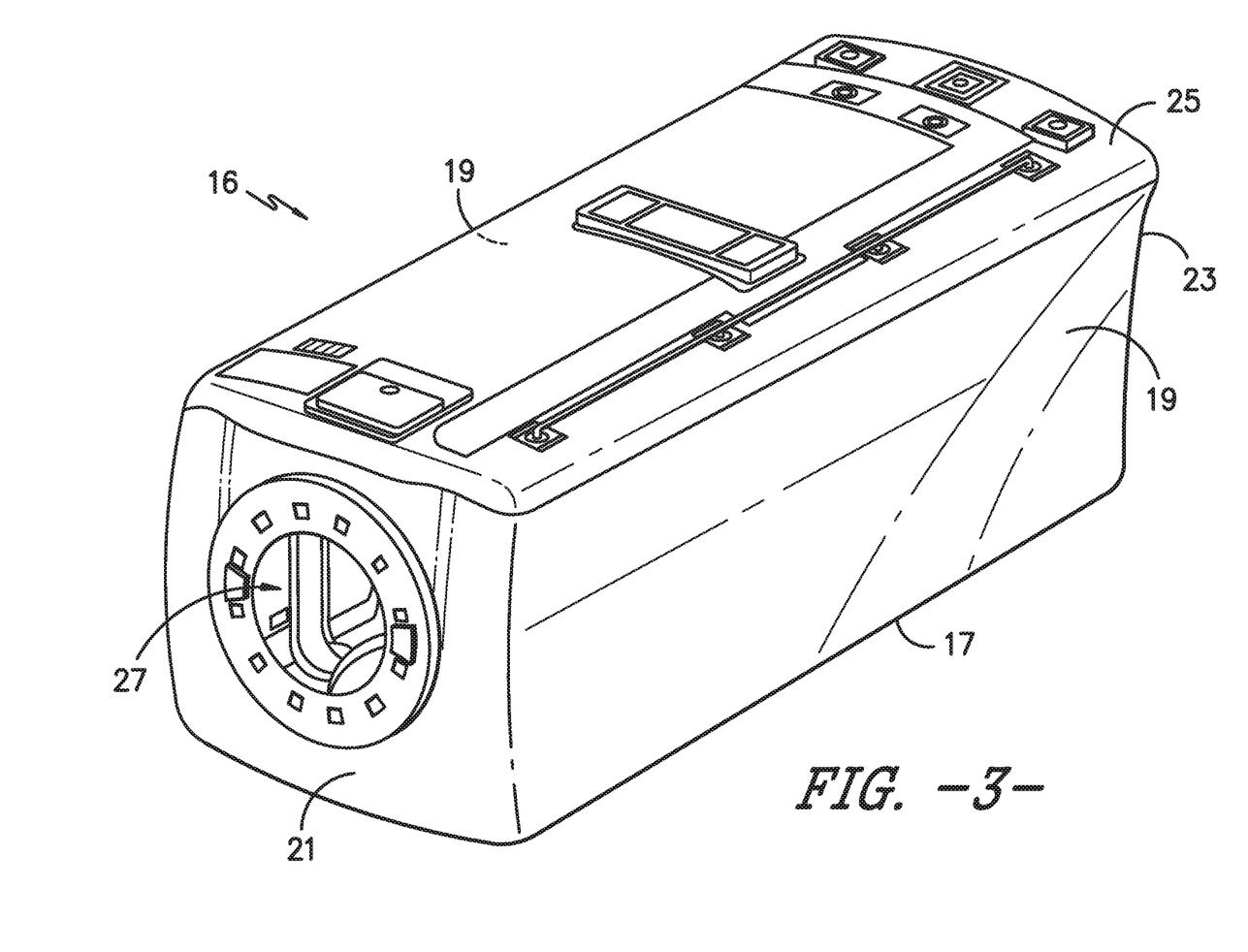
FIG. 3 illustrates a perspective view of one embodiment of a nacelle of a wind turbine according to the present disclosure, particularly illustrating the various external walls of the nacelle.

Referring now to FIG. 2, a simplified, internal view of one embodiment of the nacelle 16 of the wind turbine 10 shown in FIG. 1, particularly illustrating the drivetrain components thereof, is illustrated. More specifically, as shown, the generator 24 may be coupled to the rotor 18 for producing electrical power from the rotational energy generated by the rotor 18. The rotor 18 may be coupled to the main shaft 34, which is rotatable via a main bearing (not shown). The main shaft 34 may, in turn, be rotatably coupled to a gearbox output shaft 36 of the generator 24 through a gearbox 30. The gearbox 30 may include a gearbox housing 38 that is connected to the bedplate 46 by one or more torque arms 48. More specifically, in certain embodiments, the bedplate 46 may be a forged component in which the main bearing (not shown) is seated and through which the main shaft 34 extends. As is generally understood, the main shaft 34 provides a low speed, high torque input to the gearbox 30 in response to rotation of the rotor blades 22 and the hub 20. Thus, the gearbox 30 thus converts the low speed, high torque input to a high speed, low torque output to drive the gearbox output shaft 36 and, thus, the generator 24.

Each rotor blade 22 may also include a pitch adjustment mechanism 32 configured to rotate each rotor blade 22 about its pitch axis 28 via a pitch bearing 40. Similarly, the wind turbine 10 may include one or more yaw drive mechanisms 42 communicatively coupled to the controller 26, with each yaw drive mechanism(s) 42 being configured to change the angle of the nacelle 16 relative to the wind (e.g., by engaging a yaw bearing 44 of the wind turbine 10).

During operation of the wind turbine 10, various wind turbine components, such as those described herein, may become worn and/or damaged due to operating loads and forces from the wind acting on the wind turbine. Depending on the location of the damaged components, repair thereof can create unsafe conditions for personnel as access to the components uptower is difficult. As such, the present disclosure is directed to an external ladder assembly 50 for the nacelle 16 of the wind turbine 10 that provides external access to various uptower locations around the nacelle 16.

Figure 4:
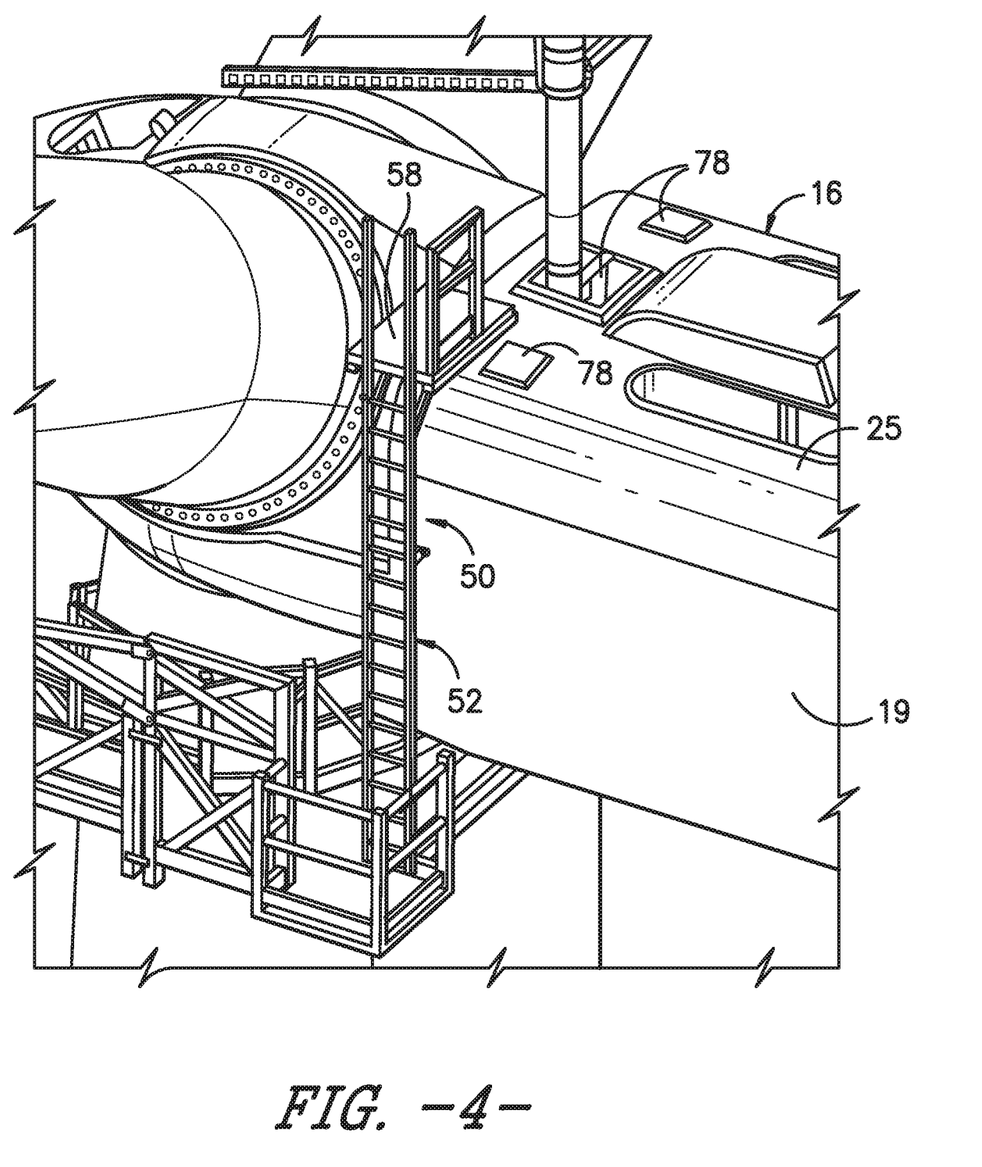
FIG. 4 illustrates a perspective view of one embodiment of a nacelle of a wind turbine according to the present disclosure, particularly illustrating an external ladder assembly mounted to a top wall of the nacelle.

More specifically, as shown in FIGS. 4-7, various embodiments of the various components of an external ladder assembly 50 according to the present disclosure are illustrated. For example, as shown particularly in FIGS. 4 and 5, the ladder assembly 50 includes at least one ladder 52 having parallel side legs 54 and a plurality of rungs 56 arranged between the parallel side legs 54. In addition, as shown in FIG. 4, the ladder 52 may be placed or positioned adjacent to an exterior side of the nacelle 16 (e.g. adjacent to the side walls 19). As such, by placing the ladder 52 adjacent to one of the exterior side walls 19 of the nacelle 16, certain uptower, external features can be easily and safely accessible without the use of a crane, which is described in more detail below.

Figure 5:
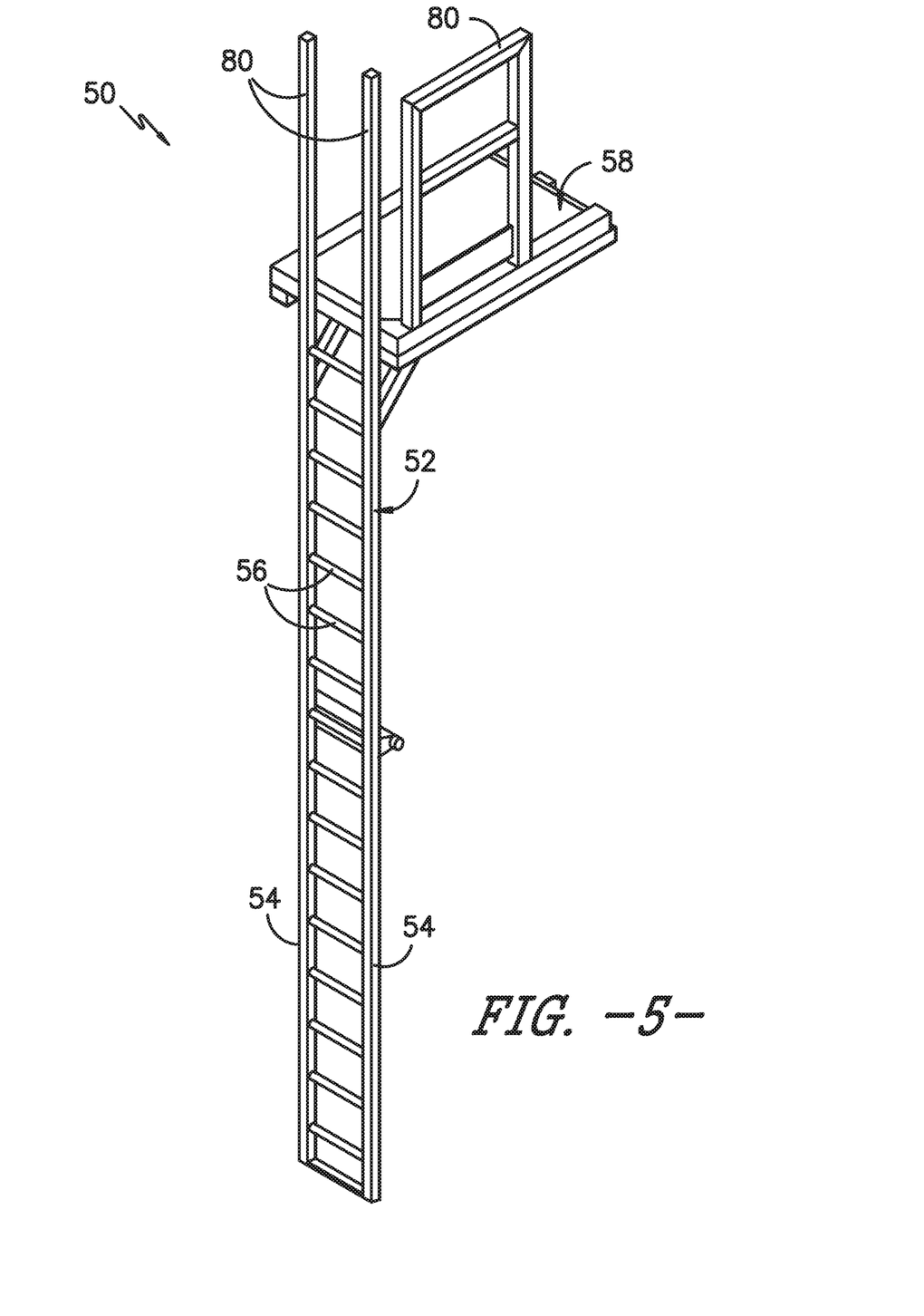
FIG. 5 illustrates a perspective view of one embodiment of an external ladder assembly according to the present disclosure, particularly illustrating the ladder and ladder platform thereof.

Referring particularly to FIGS. 4 and 5, the ladder assembly 50 also includes a ladder platform 58 arranged with the ladder 52 and configured for placement atop the nacelle 16. Moreover, as shown particularly in FIGS. 6 and 7, the ladder assembly 50 also includes a mounting assembly 60 for affixing the ladder platform 58 atop the nacelle 16. As such, the mounting assembly 60 is adjustable between multiple positions so as to level the ladder platform atop the nacelle 16. Thus, adjustability of the mounting assembly 60 allows the ladder assembly 50 to accommodate to nacelles of varying sizes, shapes, and contours. In addition, as shown, the ladder assembly 50 provides access to one or more uptower, external features of the wind turbine 10. For example, in certain embodiments, the uptower, external features of the wind turbine 10 may include an externally-mounted working platform, one of the pitch bearings 40, the rotor 18, the hub 20, one of the rotor blades 22, an access door 78 (FIGS. 4 and 6), or any other suitable uptower location.

Figure 6:
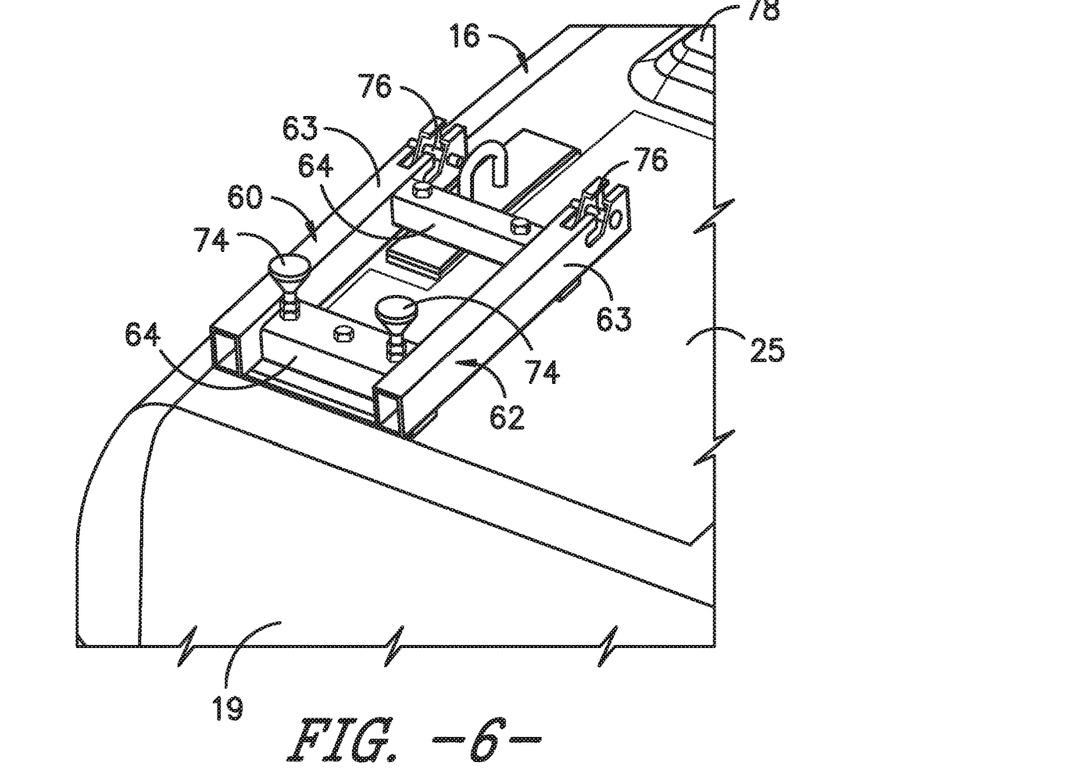
FIG. 6 illustrates a perspective view of one embodiment of a mounting assembly of an external ladder assembly according to the present disclosure.
Figure 7:
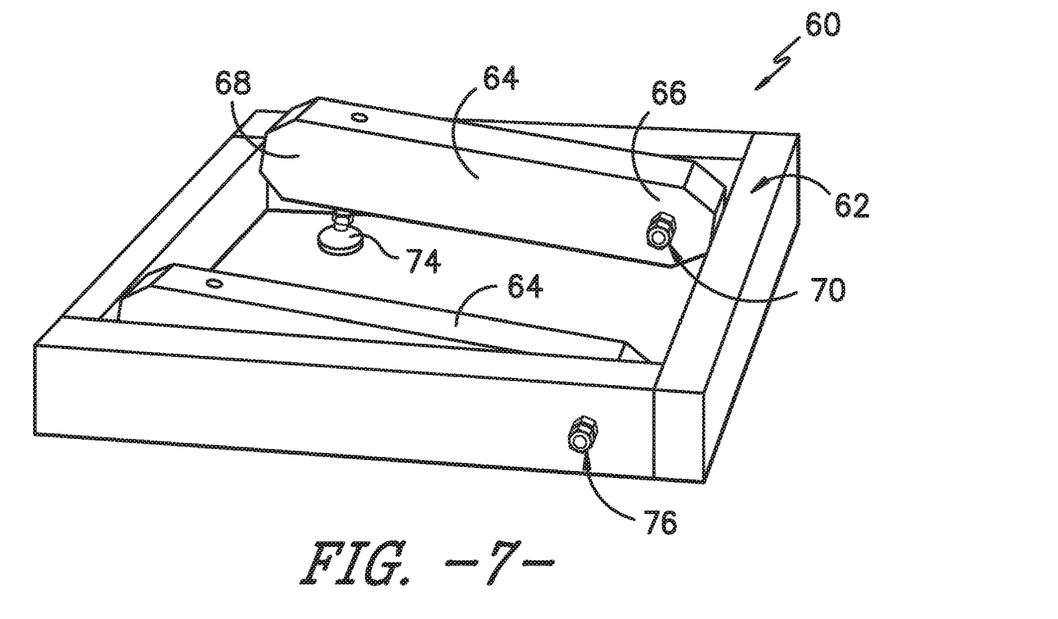
FIG. 7 illustrates a perspective view of another embodiment of a mounting assembly of an external ladder assembly according to the present disclosure.

In one embodiment, as shown in FIGS. 6 and 7, the mounting assembly 60 may include a mounting frame 62 with at least one adjustable frame member 64. In such embodiments, the mounting frame 62 is mountable atop the nacelle 16 (i.e. to the top wall 25) and the adjustable frame member(s) is configured to lift or lower the ladder platform 58 so as to provide a level surface atop the nacelle 16. In certain embodiments, as shown in FIGS. 6 and 7, the mounting assembly 60 may include at least two adjustable frame members 64 that are configured to lift or lower the ladder platform 58 so as to provide a level surface atop the nacelle 16.

Referring particularly to the embodiment of FIG. 6, the mounting frame 62 of the mounting assembly 60 may include two generally parallel frame members 63. Further, as shown, the adjustable frame members 64 may be mounted generally parallel to the parallel frame members 63. Moreover, as shown, one or more of the adjustable frame members 64 may include at least one jacking component 74 mounted thereto. As such, when the ladder platform 58 is secured atop the mounting assembly 60, the jacking component(s) 74 are configured to lift or lower the ladder platform 58 to create a level surface atop the nacelle 16.

In an alternative embodiment, as shown particularly in FIG. 7, the mounting frame 62 of the mounting assembly 60 may include a generally square configuration with the adjustable frame members 64 mounted therein. In such embodiments, the adjustable frame members 64 may have a first end 66 and second end 68. As such, the first end 66 may be mounted to one side of the mounting frame 62 via at least one fastener 68 at a rotatable hinge point 70. Further, as shown, the second end 68 is rotatable about the hinge point 70, e.g. via the jacking component(s) 74, which are mounted beneath the adjustable frame members 64 (rather than on top as shown in FIG. 6). Thus, in the embodiment of FIG. 7, the jacking component(s) 74 is configured to lift and/or lower the second end 68 of the adjustable frame member(s) 64 so as to lift and/or lower the ladder platform 58 that is mounted thereon. Once adjusted, the frame members 64 can be secured in place to maintain a position of the ladder platform 58 after the platform 58 is level. For example, in one embodiment, the frame members 64 may be secured by tightening the jacking components 74 and/or the fasteners 68.

Still referring to FIGS. 6 and 7, in additional embodiments, the mounting frame 62 may also include one or more locating features 76 for aligning the ladder platform 58 thereon. For example, as shown, the locating feature(s) 76 may include front locating features, rear locating features, side locating features, or combinations thereof, such that the ladder platform 58 and the ladder 52 cannot be incorrectly placed onto the top wall 25 of the nacelle 16.

In additional embodiments, the ladder assembly 50 may also include a tie off location for personnel. For example, as shown in FIG. 4, the tie off location may be any of the ladder assembly components (e.g. the ladder platform 58 and/or the mounting assembly 60) as well as any suitable external wind turbine components capable of supporting a minimum weight. In similar embodiments, as shown in FIG. 5, the ladder 52 and/or the ladder platform 58 may also include one or more handrails 80 for providing additional safety for personnel.

It should also be understood that the external ladder assembly 50 described herein may be constructed of any suitable material and may have any desired shape. For example, in certain embodiments, the external ladder assembly 50 may be constructed of a material configured to support any suitable weight. Such materials may include but are not limited to aluminum, wood, steel, a composite material, and/or combinations thereof.

Figure 8:
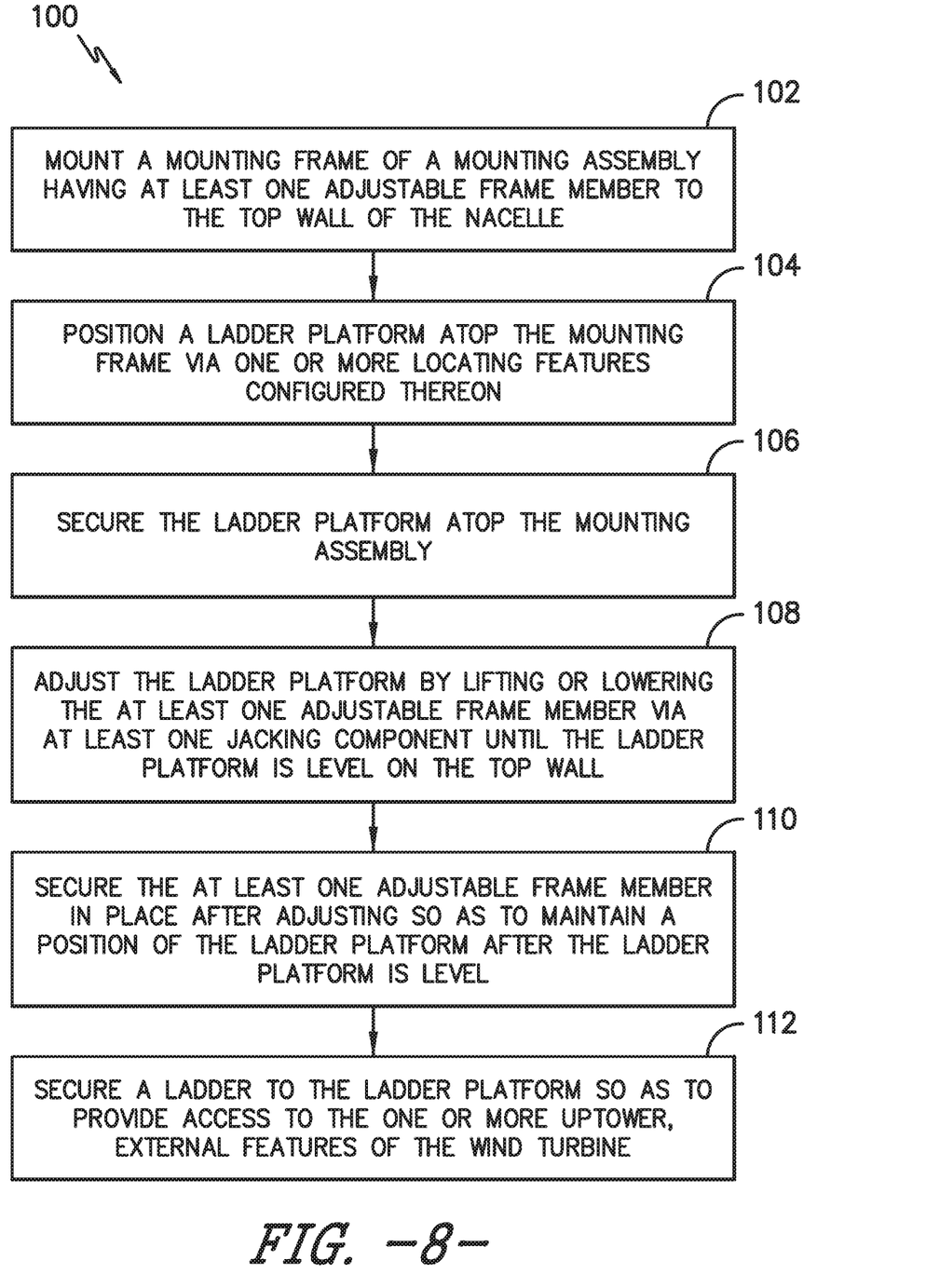
FIG. 8 illustrates a flow diagram of one embodiment of a method for providing access to one or more uptower, external features of a wind turbine without the use of a crane according to the present disclosure.

Referring now to FIG. 8, a flow diagram of one embodiment of a method 100 for providing access to one or more uptower, external features of a wind turbine, such as the wind turbine 10 of FIG. 1, without the use of a crane is illustrated. The method includes mounting the mounting assembly 60 to the top wall 25 of the nacelle 16 of the wind turbine 10. More specifically, as shown at 102, the method 100 includes mounting the mounting frame 62 of the mounting assembly 60 (with the adjustable frame members 64) to the top wall 25 of the nacelle 16. As shown at 104, the method 100 includes positioning the ladder platform 58 atop the mounting frame 62 via the locating features 76 configured thereon.

Once positioned, as shown at 106, the method 100 includes securing the ladder platform 58 atop the mounting assembly 60. As shown at 108, the method 100 includes adjusting the ladder platform 58 via the mounting assembly 60 until the ladder platform 58 is level on the top wall 25 of the nacelle 16. For example, in one embodiment, the method 100 may include adjusting the ladder platform 58 by lifting or lowering the adjustable frame member(s) 64 via the jacking component(s) 74. As shown at 110, the method 100 includes securing the adjustable frame member(s) 64 in place after adjusting so as to maintain a position of the ladder platform 58 after the platform 58 is level. For example, as mentioned, the adjustable frame member(s) 64 may be secured in place by tightening the fasteners 70 and/or the jacking component, or locking the adjustable frame member(s) 64 in place via any other suitable locking feature. As shown at 112, the method 100 includes securing the ladder 52 to the ladder platform 58 so as to provide access to various uptower, external features of the wind turbine 10. More specifically, in one embodiment, the method 100 may also include positioning the ladder 52 adjacent to one of the side walls 19 of the nacelle 16.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An external ladder assembly for a nacelle of a wind turbine, the ladder assembly comprising:
   at least one ladder comprising parallel side legs and a plurality of rungs arranged between the parallel side legs;
   a ladder platform arranged with the ladder and configured for placement on an upper-most surface of the nacelle; and,
   a mounting assembly secured to and beneath the ladder platform for affixing the ladder platform on the upper-most surface of the nacelle, the mounting assembly being adjustable between multiple positions so as to level the ladder platform on the upper-most surface of the nacelle, the mounting assembly comprising a mounting frame with at least one adjustable frame member, the mounting frame mountable on the upper-most surface of the nacelle, the at least one adjustable frame member configured to lift or lower the ladder platform so as to provide a level surface on the upper-most surface of the nacelle, the mounting frame comprising one or more locating features for aligning the ladder platform thereon,
   wherein the at least one ladder and the ladder platform provide access to one or more uptower, external features of the wind turbine.

2. The ladder assembly of claim 1, wherein the mounting assembly further comprises at least two adjustable frame members that are configured to lift or lower the ladder platform so as to provide a level surface on the upper-most surface of the nacelle.

3. The ladder assembly of claim 1, wherein the at least one adjustable frame member comprises a first end and second end, the first end mounted to the mounting frame via at least one fastener at a rotatable hinge point, the second end rotatable about the hinge point via at least one jacking component.

4. The ladder assembly of claim 1, wherein the at least one adjustable frame member is securable in place to maintain a position of the ladder platform after the ladder platform is level.

5. The ladder assembly of claim 1, wherein the one or more locating features comprises at least one of front locating features, rear locating features, side locating features, or combinations thereof.

6. The ladder assembly of claim 1, wherein the ladder is configured for placement adjacent to an exterior side of the nacelle.

7. The ladder assembly of claim 1, wherein the one or more uptower, external features comprise at least one of a platform, a pitch bearing, a rotor, a hub, a rotor blade, or an access door.

8. The ladder assembly of claim 1, further comprising a tie off location for personnel.

9. The ladder assembly of claim 1, wherein at least one of the at least one ladder or the ladder platform further comprises one or more handrails for personnel.

* * * * *